June 18, 1963  E. J. JOHNSTON  3,093,954
PARALLEL BAR SIDE DELIVERY RAKE WITH TINE BAR ADJUSTING MEANS
Filed April 11, 1961  2 Sheets-Sheet 1
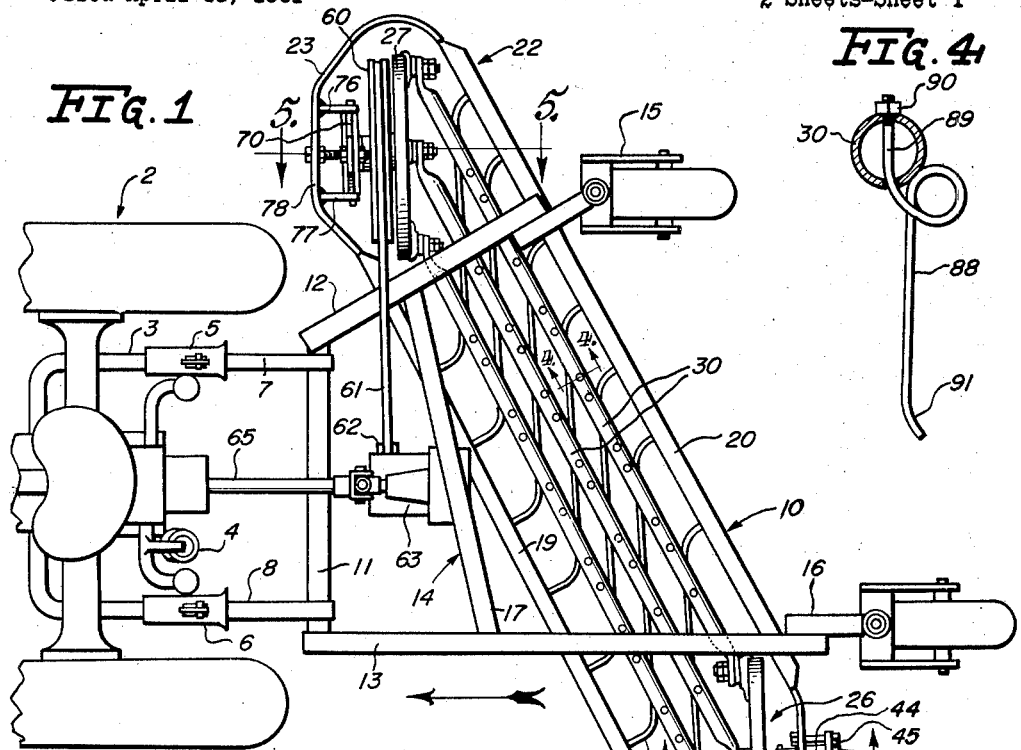
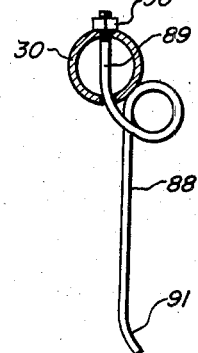
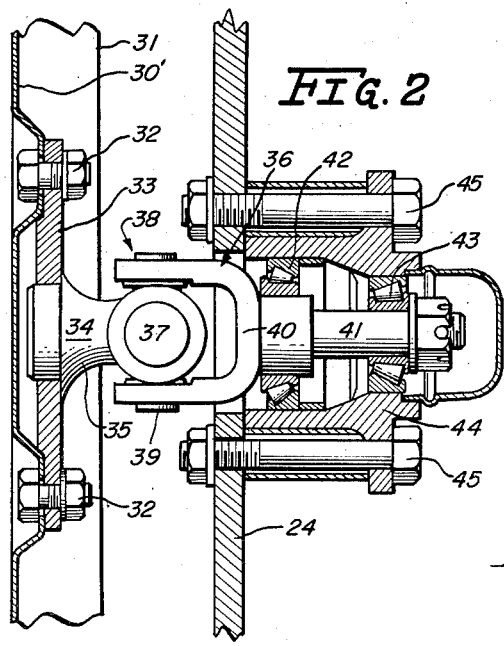
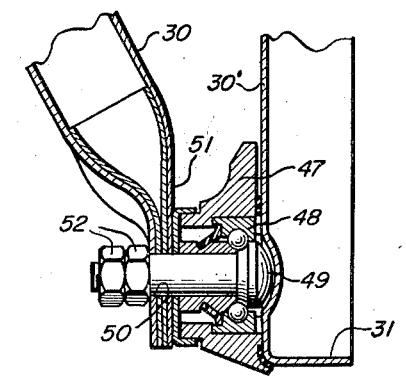
INVENTOR
Edward J. Johnston
Paul O. Pippel
ATTORNEY June 18, 1963 E. J. JOHNSTON 3,093,954
PARALLEL BAR SIDE DELIVERY RAKE WITH TINE BAR ADJUSTING MEANS
Filed April 11, 1961 2 Sheets-Sheet 2
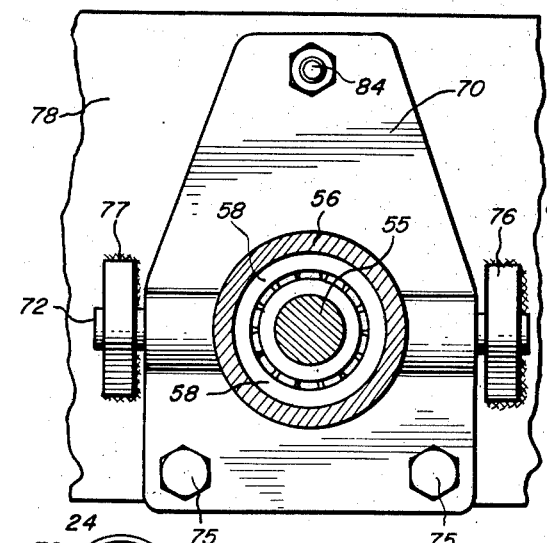
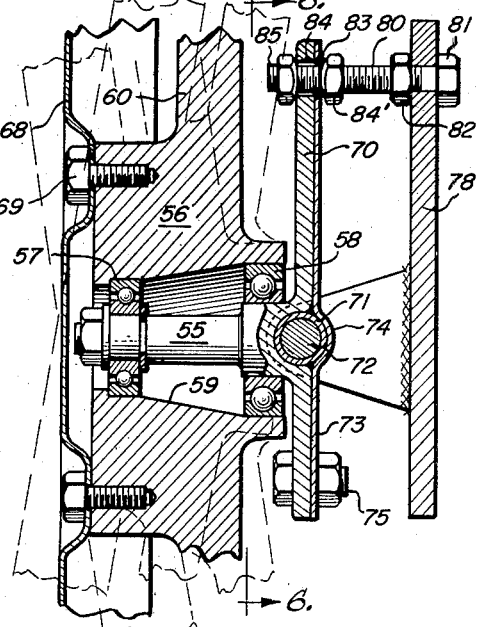
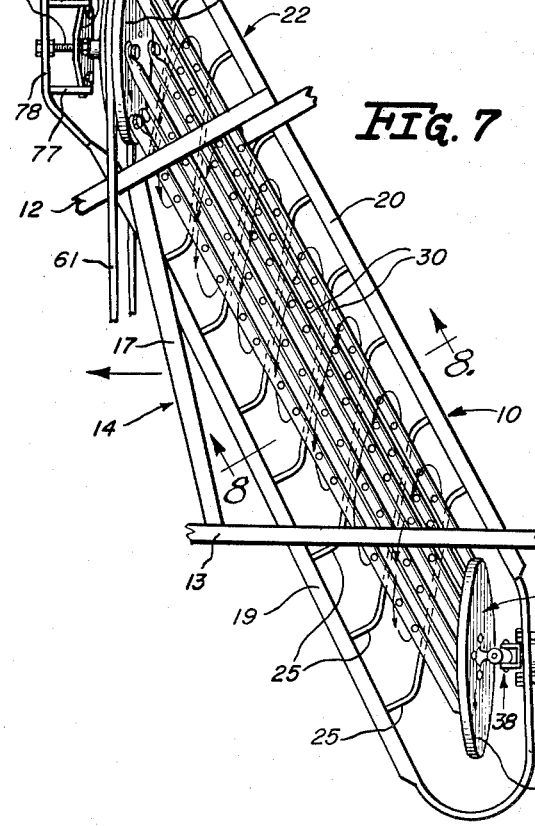
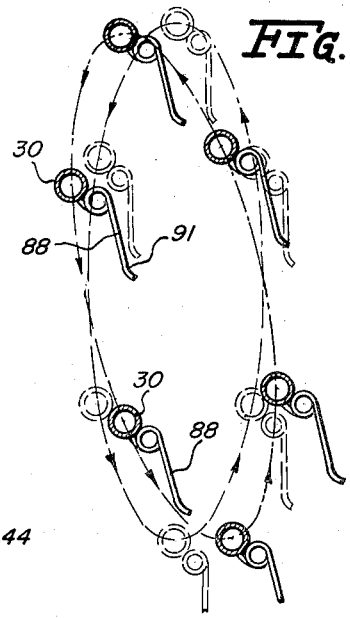
INVENTOR
Edward J. Johnston
ATTORNEY

United States Patent Office 3,093,954
Patented June 18, 1963

3,093,954
PARALLEL BAR SIDE DELIVERY RAKE WITH
TINE BAR ADJUSTING MEANS
Edward J. Johnston, La Grange Park, Ill., assignor to International Harvester Company, Chicago, Ill., a corporation of New Jersey
Filed Apr. 11, 1961, Ser. No. 102,238
8 Claims. (Cl. 56—377)

This invention relates to side delivery rakes of the parallel bar type wherein a plurality of rake bars interconnect a pair of end members which are mounted for rotation on parallel axially and laterally spaced axes.

In side delivery rakes one of the problems has been to provide an adjustment for the raking reel in such manner as to change the raking attitude of the teeth. Under some conditions it is necessary to have a positive lead, in others the teeth must be disposed substantially vertically, and under other conditions it is desirable to have the teeth trail as they sweep along the ground. In order to accomplish this it has been heretofore necessary to provide an auxiliary frame between the main frame of the rake and the basket and the auxiliary frame is arranged to swing about a horizontal axis, raising and lowering one side of the basket carried thereby and the reel which is supported in the basket. In this manner the entire basket together with the reel was adjusted about a horizontal axis, thus controlling the position of the teeth as they are adjacent to the ground. This construction is expensive since it involves a duplication of frames and adds considerable weight to the rake inasmuch as an additional frame has to be carried by the main frame. Since it is necessary to insure that the two end members operate on parallel axes, a framework carrying the same has to be rigidly constructed to insure that the parts will operate and not bind.

A general object of the invention is to provide a novel rake reel mounting wherein by adjusting the position of the end members the raking attitude of the reel is accordingly adjusted.

More specifically, the invention contemplates the provision of a novel mounting for a parallel bar rake reel which includes a pair of end members and a plurality of interconnecting bars, the mounting for the end members being such that the axes of rotation of the end members may be skewed about a vertical axis in order to comparably vary the disposition and the position of the teeth as desired.

More specifically, the invention contemplates the provision of a universal mounting for one end member and a mounting adjustable about a substantially vertical axis for the other end member whereby the disposition of the last-mentioned end member controls the disposition of the rake bars and the path of movement thereof.

These and other objects and advantages inherent in and encompassed by the invention will become more readily apparent from the specification and the drawings, wherein:

FIG. 1 is a plan view of a novel rake with a tractor fragmentarily shown;

FIG. 2 is an enlarged sectional view taken substantially on the line 2—2 of FIG. 1;

FIG. 3 is a horizontal sectional view through a bearing mounting between the bar and an end member;

FIG. 4 is an enlarged sectional view taken substantially on the line 4—4 of FIG. 1;

FIG. 5 is an enlarged sectional view taken substantially on the line 5—5 of FIG. 1;

FIG. 6 is a sectional view taken substantially on the line 6—6 of FIG. 1;

FIG. 7 is a fragmentary plan view showing the reel in a position skewed from the position shown in FIG. 1; and FIG. 8 is a transverse vertical sectional view on a large scale illustrating in phantom lines several positions of rake reel parts illustrating the disposition of the teeth.

Describing the invention in detail and having particular reference to the drawings, there is shown a tractor generally designated 2 which includes a hitch structure 3 including hydraulically actuated linkage 4 for lifting and lowering the hitch structure, said hitch structure 3 having a pair of sockets 5 and 6 which admit the points 7 and 8 of a parallel bar side delivery rake generally designated 10.

The rake 10 includes a transverse front member 11 to which are connected the front ends of a pair of fore-and-aft extending main beam members 12 and 13 of a main rake frame generally designated 14 which at the rear ends of the frame members 12 and 13 includes the rear supporting caster wheel assemblies 15 and 16 and intermediate the ends of the frame comprises a transverse brace member 17 interconnecting the members 12 and 13 substantially medially thereof. The frame structure 14 is integrally connected with the front and rear transverse beam members 19 and 20 of a parallel bar side delivery rake basket generally designated 22, said basket including front and rear end beams 23 and 24 and a plurality of laterally spaced stripper bars 25 interconnecting the front and rear beam members 19 and 20 and passing beneath the rake reel generally designated 26.

The rake reel 26 comprises front and rear end members or spiders 27 and 28 which are mounted on substantially parallel laterally and axially spaced axes and are interconnected by a plurality of tooth bars 30 about the peripheries thereof.

The rear end member 28 comprises a substantially flat circular or annular disk 30' with a peripheral flange 31, the central portion of the sheet steel disk 30' being connected as by bolts 32 to a radial plate 33 which is integrally connected with the stub shaft 34 of a front jaw member 35 of a universal joint generally designated 36. The jaw member 35 has its jaws pivoted on the shaft 37 of the cross 38 and the shaft 39 of the cross which is at right angles to the shaft 37 is pivoted to the jaw member 40 which is connected to the mounting shaft 41, shaft 41 being supported by bearings 42 and 43 within a housing 44 on a substantially horizontal axis, the housing 44 being suitably connected as by bolts 45 to the beam member 24 of the rake basket frame 22.

It will be seen that about the periphery of the member 28 as well as the member 27 there are provided a plurality of bearing housings 47 which encase bearings 48 which support and spindle the stub shaft 49, the shaft 49 extending outwardly of the housing 47 and through an opening 50 in the bent or flattened end portion 51 of the related tine bar 30 and secured thereto by means of the nuts 52. It will be noted that a limited amount of universal movement of the spindle 49 with respect to the bearing 48 and thus the related end member is feasible.

Thus it will be recognized that the members 27 and 28 orbit together and that in view of the mounting of the member 28 on universal means that it will follow the path of movement of the member 27 which is mounted on a fixed axis on a shaft 55 which extends through a hub portion 56 and supports a pair of bearings 57 and 58 which are confined within a bore 59 in the hub portion 56 of the drive pulley 60 which has a belt 61 trained thereabout, the belt 61 being trained about a driving pully 62 which is suitably mounted from a gear box assembly or gear train 63 which is supported from the cross member 17, the gear train 63 being driven by the shaft structure 65 which is suitably connected to the power take-off of the associated tractor 2.

A feature of the present invention is in the provision of a novel mounting of the end member 27 so that its axis of rotation may be adjusted about a substantially horizontal axis. It will be seen from a consideration of FIG. 5 that the plate structure 68 of the member 27, which is similar to the plate structure 30' of the member 28, is connected as by bolts 69 to the hub portion 56. The shaft 55 is integrally connected with a radial mounting pad or plate structure 70 which in alignment with the axis of the shaft 55 is provided with a concavity or a bearing 71 substantially normal to the axis of the portion 55 and it admits a cross shaft 72 therethrough, the cross shaft 72 being embraced on its back side by a clamping plate 73 which is arcuately contoured as at 74 to provide a pivotal mounting for the member 27 together with the pulley 60 about a substantially horizontal axis. The plate 73 is secured to the plate 70 by means of bolts 75 whereby the clamping plate and the mounting plate 70 are separable for assembly and disassembly with respect to the shaft 72 which is mounted on a pair of substantially vertical horizontally spaced ears or mounting lugs 76 and 77 which are integrally united with the portion 78 of the end member or end part 23 of the rake basket. It will be seen that above the axis of pivot of the mounting structure for the member 27 there is provided an adjusting means in the form of a bolt which has a shank portion 80 extending through the portion 78 and having a head 81 engaging the outer side and a nut 82 engaging the inner side whereby, for all intent and purposes, the bolt 81 is integral with the portion 78. The shank portion 80 projects through aligned loose openings 83, 84 in the members 70 and 73 and there are provided adjusting nuts 84', 85 embracing the mounting or holder structure 70, 73. It will be realized that by advancing the nuts 84', 85 along the shank 80 the member 27 will be tilted upwardly and by retracting the nuts 84' 85 the end member 27 will be tilted downwardly. It will be appreciated that after adjustment is made the nuts 84' 85 are drawn up against opposite sides of the structure 70, 73 and thus the end member is mounted for adjustment about an axis and selectively secured in various positions. It will be readily appreciated that in view of the fact that the end member 28 is mounted for rotation on a universal mounting that its rotational position will be determined by the position of the member 27 and the position of the tine bars will also be determined and thus the position of the dependent rake teeth 88 which are secured to the tine bars by means of the axial extension 89 and the nut 90. It will be appreciated that insofar as this invention is concerned, the manner of mounting of the teeth with respect to the tine bars is relatively immaterial provided, of course, that the tines depend from the tine bars. It will be readily appreciated that by tilting the end member 27 upwardly the raking attitude or pitch of the teeth or the dependent portions 91 of the teeth is negative and that by locating the end member 27 vertically the teeth will assume a vertical position with respect to the ground, shown in phantom lines in FIG. 8, and that by inclining the rake downwardly positive raking attitude on the teeth is obtained.

Thus a novel, simple and effective arrangement is provided for adjusting the raking attitude of the rake and a simple and inexpensive connection is provided between the tine bars and the rake members.

It will be appreciated that a preferred form of the invention has been disclosed and that other embodiments will become more readily apparent to those skilled in the art within the scope of the appended claims.

What is claimed is:

1. A side delivery rake comprising a pair of rotatable end members, means including at least one universal coupling means mounting said end members for rotation on parallel axes of rotation laterally and axially displaced from one another, a plurality of rake bar members having connections at opposite ends with respective end members effective to hold the bar members against rotation about their axes while moving bodily with the end members about the axes of the end members, said means adjustable about a substantially horizontal axis to position said end members to rotate on axes disposed at various angular relation to the horizontal.

2. A side delivery rake comprising a pair of rotatable end members, means mounting said end members for rotation on parallel axes of rotation laterally and axially displaced from one another, a plurality of rake bar members having connections at opposite ends with respective end members effective to hold the bar members against rotation about their axes while moving bodily with the end members about the axes of the end members, and said means comprising a flexible joint mounting one of said end members and a fixed mounting for the other end member and adjustable about an axis angularly related to said axes.

3. In a side delivery rake, the combination of a supporting structure, a pair of end members having generally parallel axes of rotation laterally displaced from one another and disposed in a fore-and-aft direction such that the rotational planes of said members extend transversely of the line of travel, a plurality of rake bars connected to and extending between the end members and having dependent teeth, and means adjustably mounting said end members from the supporting structure for disposing said members at selected angular positions with respect to the vertical.

4. The invention according to claim 3 and at least one of said means comprising a spindle rotatably supporting the associated end member, a pivotal mounting structure supporting said spindle for pivotal movement about a substantially horizontal transverse axis, and means between said spindle and the support for holding the spindle in selected vertically displaced positions.

5. In a side delivery rake, the combination of a supporting structure, a pair of end members having generally parallel axes of rotation laterally displaced from one another and disposed in a fore-and-aft direction such that the rotational planes of said members extend transversely of the line of travel, a plurality of rake bars connected to and extending between the end members and having dependent teeth, and means adjustably mounting said end members from the supporting structure for disposing said members at selected angular positions with respect to the vertical, at least one of said means comprising a universal mounting supporting the associated end member from the supporting structure.

6. A raking attitude adjusting mechanism for a side delivery rake of the type comprising a pair of end members and means mounting the end members for rotation on laterally and axially offset generally horizontal axes, and rake bars extending between and having connections with the end members for bodily rotation therewith about the axes of the end members, said mechanism comprising means having universal flexibility mounting one of the end members for rotation about an axis determined by the axis of rotation of the other end member, and means adjustably mounting the other end member on a fixed axis.

7. The invention according to claim 6 and said adjustable means comprising a shaft rotatably supporting the associated end member, and means providing an axis of pivot for said shaft about an axis transverse to the shaft in selected positions thereon.

8. In a side delivery rake having a frame, a transversely elongated rake basket supported therefrom and having end portions spaced transversely to the line of travel of the rake, a rake reel having a pair of end members and intervening interconnecting rake bars, means mounting said end members from the end portions of the basket for rotation on substantially parallel laterally and axially offset axes, said means including mountings adjustable to position said end members vertically and at an angle to the vertical and one of said means being universal.

References Cited in the file of this patent

UNITED STATES PATENTS 2,667,027  Hauswirth _____ Jan. 26, 1954